United States Patent
Matsumoto

(10) Patent No.: US 10,402,683 B2
(45) Date of Patent: Sep. 3, 2019

(54) IMAGE DISPLAY CONTROL SYSTEM, IMAGE DISPLAY CONTROL METHOD, AND IMAGE DISPLAY CONTROL PROGRAM FOR CALCULATING EVALUATION VALUES OF DETECTED OBJECTS

(71) Applicant: FUJIFILM Corporation, Tokyo (JP)

(72) Inventor: Tetsuya Matsumoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 33 days.

(21) Appl. No.: 15/676,262

(22) Filed: Aug. 14, 2017

(65) Prior Publication Data
US 2018/0082148 A1 Mar. 22, 2018

(30) Foreign Application Priority Data
Sep. 16, 2016 (JP) ................................. 2016-181641

(51) Int. Cl.
| | |
|---|---|
| *G06K 9/00* | (2006.01) |
| *G06K 9/62* | (2006.01) |
| *G06T 7/70* | (2017.01) |
| *G06T 11/60* | (2006.01) |

(52) U.S. Cl.
CPC ....... *G06K 9/6218* (2013.01); *G06K 9/00697* (2013.01); *G06T 7/70* (2017.01); *G06T 11/60* (2013.01)

(58) Field of Classification Search
CPC .......... G06K 9/6218; G06T 11/60; G06T 7/70
See application file for complete search history.

(56) References Cited

U.S. PATENT DOCUMENTS

| | | | |
|---|---|---|---|
| 8,345,940 B2* | 1/2013 | Mattiuzzi | G06F 19/321 382/128 |
| 2005/0067529 A1* | 3/2005 | Takadama | B64G 9/00 244/118.1 |
| 2007/0242861 A1 | 10/2007 | Misawa et al. | |
| 2008/0037841 A1 | 2/2008 | Ogawa | |
| 2011/0043633 A1* | 2/2011 | Sarioglu | G01S 5/16 348/148 |

(Continued)

FOREIGN PATENT DOCUMENTS

| | | |
|---|---|---|
| JP | 2001-169311 A | 6/2001 |
| JP | 2002-279421 A | 9/2002 |

(Continued)

OTHER PUBLICATIONS

An Office Action mailed by the Japanese Patent Office dated Apr. 16, 2019, which corresponds to Japanese Patent Application No. 2016-181641 and is related to U.S. Appl. No. 15/676,262.

(Continued)

*Primary Examiner* — Amir Alavi
(74) *Attorney, Agent, or Firm* — Studebaker & Brackett PC

(57) ABSTRACT

Provided are an image display control system, an image display control method, and a program that can inform a user of an image including a specific object with a high evaluation value. Each type of object in an image is detected and the evaluation values of the detected objects are calculated using different evaluation criteria for the types of objects. An image including an object of which the calculated evaluation value is equal to or greater than a threshold value is displayed so as to be highlighted.

19 Claims, 16 Drawing Sheets

(56) References Cited

U.S. PATENT DOCUMENTS

| | | | |
|---|---|---|---|
| 2012/0147035 A1* | 6/2012 | Reinpoldt, III | G01V 8/005 |
| | | | 345/629 |
| 2013/0004073 A1* | 1/2013 | Yamaji | G06T 11/60 |
| | | | 382/173 |
| 2013/0069978 A1 | 3/2013 | Tanaka et al. | |
| 2013/0155204 A1* | 6/2013 | Kokubun | G03B 35/02 |
| | | | 348/49 |
| 2014/0184869 A1 | 7/2014 | Misawa et al. | |
| 2015/0165971 A1* | 6/2015 | Grundmann | B60Q 9/008 |
| | | | 348/148 |
| 2015/0375742 A1* | 12/2015 | Gebert | B62D 15/027 |
| | | | 701/23 |
| 2017/0310898 A1 | 10/2017 | Misawa et al. | |
| 2017/0372485 A1* | 12/2017 | Tsunashima | G06K 9/00335 |
| 2018/0082148 A1* | 3/2018 | Matsumoto | G06T 7/70 |

FOREIGN PATENT DOCUMENTS

| | | |
|---|---|---|
| JP | 2007-274207 A | 10/2007 |
| JP | 2011-077753 A | 4/2011 |
| JP | 2012-022353 A | 2/2012 |
| JP | 2013-065110 A | 4/2013 |
| JP | 5449460 B2 | 3/2014 |

OTHER PUBLICATIONS

An Office Action mailed by the Japanese Patent Office dated Jun. 18, 2019, which corresponds to Japanese Patent Application No. 2016-181641 and is related to U.S. Appl. No. 15/676,262.

\* cited by examiner

| THEME | TYPE OF OBJECT |
|---|---|
| TRAVEL | MOUNTAIN, LAKE, SHRINE, FLOWER, FOOD – – – |
| WEDDING CEREMONY | DRESS, RING, BOUQUET, FOOD – – – |
| ENTRANCE CEREMONY | SCHOOL BAG, SCHOOL GATE – – – |
| ⋮ | ⋮ |

FIG. 14

| TYPE OF OBJECT | APPEARANCE FREQUENCY | CORRECTION COEFFICIENT |
|---|---|---|
| MOUNTAIN | 123/N | k1 |
| RIVER | 85/N | k2 |
| FLOWER | 80/N | k3 |
| FOOD | 55/N | k4 |
| ¦ | ¦ | ¦ |

IMAGE DISPLAY CONTROL SYSTEM, IMAGE DISPLAY CONTROL METHOD, AND IMAGE DISPLAY CONTROL PROGRAM FOR CALCULATING EVALUATION VALUES OF DETECTED OBJECTS

CROSS-REFERENCE TO RELATED APPLICATIONS

The present application claims priority under 35 U.S.C. § 119 to Japanese Patent Application No. 2016-181641, filed Sep. 16, 2016. Each of the above application(s) is hereby expressly incorporated by reference, in its entirety, into the present application.

BACKGROUND OF THE INVENTION

1. Field of the Invention

The present invention relates to an image display control system, an image display control method, and an image display control program.

2. Description of the Related Art

A technique has been achieved which enables a user to select images from a plurality of images and creates an album using the images selected by the user. It is troublesome for the user to select a desired image from a plurality of images. Therefore, a technique has been proposed in which a computer evaluates an image on the basis of an image evaluation algorithm and presents images with a high evaluation value as recommended images to a user such that the user selects a desired image from the presented recommended images. The evaluation of the image is performed for the entire image on the basis of, for example, the brightness and chroma of the image (JP2002-279421A and JP2001-169311A) or is performed for each region of the image (JP2012-22353A). In addition, there is a technique which displays a list of images and gives a total score to each image (JP5449460B).

SUMMARY OF THE INVENTION

However, in a case in which an image is uniformly evaluated on the basis of, for example, the brightness and chroma of the entire image or some regions of the image as disclosed in JP2002-279421A, JP2001-169311A, JP2012-22353A, and JP5449460B, a specific object included in the image is not evaluated. Even in a case in which the user is interested in a specific object, it is difficult to search for an image including the object in which the user is interested and which has a high evaluation value.

An object of the invention is to provide a technique that can inform a user of an image including an object with a high evaluation value.

According to an aspect of the invention, there is provided an image display control system comprising: an object detection device (object detection means) for detecting each type of object from a plurality of objects included in an image; an evaluation value calculation device (evaluation value calculation means) for calculating evaluation values of the objects detected by the object detection device, using different evaluation criteria for the types of objects; and an image display control device (image display control means) for displaying the image so as to be highlighted in a case in which there is an object of which the evaluation value calculated by the evaluation value calculation device is equal to or greater than a threshold value. The highlighted display of the image device that the image including an object with an evaluation value equal to or greater than the threshold value is displayed so as to be more highlighted than an image which does not include the object with an evaluation value equal to or greater than the threshold value. For example, an image including an object of which the calculated evaluation value is equal to or greater than the threshold value may be displayed so as to be more highlighted than an image that does not include the object of which the calculated evaluation value is equal to or greater than the threshold value (the images may be distinguished from each other) by the following methods: a method for brightening the image; a method for darkening the image; a method for surrounding the image with a specific frame; a method for painting the frame of the image with a specific color; a method for putting a mark in the image or in the vicinity of the image; a method for increasing or decreasing the number of marks; a method for changing the color of the mark; and a method for displaying a black-and-white image or a color image.

The invention also provides an image display control method suitable for the image display control system. That is, the image display control method comprises: allowing an object detection device to detect each type of object from a plurality of objects included in an image; allowing an evaluation value calculation device to calculate evaluation values of the objects detected by the object detection device, using different evaluation criteria for the types of objects; and allowing an image display control device to display the image so as to be highlighted in a case in which there is an object of which the evaluation value calculated by the evaluation value calculation device is equal to or greater than a threshold value.

The invention also provides non-transitory computer readable medium storing a computer readable program that controls a computer of an image display control system for achieving an image display control method.

For example, in a case in which there is an object of which the evaluation value calculated by the evaluation value calculation device is equal to or greater than the threshold value, the image display control device may display the image such that the types of objects are displayed in different modes.

The image may be included in a plurality of images and the image display control system may further comprise a theme determination device (theme determination means) for determining themes of the plurality of images. In this case, for example, the evaluation value calculation device may calculate the evaluation values of the objects detected by the object detection device, using evaluation criteria in which an object of a type associated with the theme determined by the theme determination device has a higher evaluation value than an object of a type other than the type associated with the theme determined by the theme determination device.

The types of objects may include a person and a non-person object.

For example, the evaluation value calculation device may calculate the evaluation values of the objects detected by the object detection device, using different evaluation criteria for the person between the object and the non-person object.

In a case in which the image includes a person as the object, the evaluation value calculation device may calculate the evaluation value of the person as the object, using the evaluation criteria for the person as the object. In a case in which the image does not include a person as the object, the evaluation value calculation device may calculate the evaluation value of the non-person object, using the evaluation criteria for the non-person object.

For example, the image display control device may display the image such that the person between the object of which the evaluation value calculated by the evaluation value calculation device is equal to or greater than the threshold value and the non-person object of which the evaluation value calculated by the evaluation value calculation device is equal to or greater than the threshold value are displayed in different modes.

In a case in which the non-person objects are classified according to the type of object, the evaluation value calculation device may calculate the evaluation values of the objects detected by the object detection device, using different evaluation criteria for the classified objects.

The image display control system may further comprise a classification method setting device (classification method setting means) for setting an object classification method in a case in which the non-person objects are classified according to the type of object.

The image display control device may display the image such that the classified types of non-person objects are displayed in different modes.

The image display control system may further comprise an evaluation criterion change device (evaluation criterion change means) for changing the evaluation criteria.

The image display control system may further comprise a type designation device (type designation means) for designating the type of object. In this case, for example, the image display control device may display an image including the type of object designated by the type designation device so as not to be highlighted.

In a case in which the image is included in a plurality of images, the object detection device may detect each type of object in the image included in the plurality of images. The image display control system may further comprise an appearance frequency calculation device (appearance frequency calculation means) for calculating an appearance frequency of each type of object detected by the object detection device. In this case, preferably, the evaluation value calculation device calculates the evaluation values of the objects such that an evaluation value in a case in which the appearance frequency calculated by the appearance frequency calculation device is greater than a threshold value is greater than an evaluation value in a case in which the appearance frequency is less than the threshold value.

For example, the theme determination device may determine the theme of an album to be generated, on the basis of the plurality of images.

The image display control system may further comprise: a designation device (designation means) for designating an image including a person as the object from a plurality of images; and an extraction device (extraction means) for extracting an image that includes a non-person object related to the person in the image designated by the designation device from the plurality of images. In this case, for example, the evaluation value calculation device may calculate the evaluation value of the non-person object included in the image extracted by the extraction device, using different evaluation criteria for the types of objects.

The image display control system may further comprise a selection device (selection means) for selecting an image from the images extracted by the extraction device. In this case, for example, the image display control device may display the image designated by the designation device and the image selected by the selection device in the same region.

According to the invention, each type of object is detected from a plurality of objects included in an image. The evaluation values of the objects are calculated using different evaluation criteria for the types of objects. In a case in which there is an object of which the calculated evaluation value is equal to or greater than a threshold value, the image is displayed so as to be highlighted. The evaluation value of the entire image is not calculated, but the evaluation value of the object included in the image is calculated. Therefore, the user recognizes an image including an object with a high evaluation value. In addition, since the image is displayed so as to be highlighted in a case in which there is an object of which the calculated evaluation value is equal to or greater than the threshold value, the image including an object with a high evaluation value is recognized by the highlighted display.

BRIEF DESCRIPTION OF THE DRAWINGS

FIG. 14 illustrates an example of an appearance frequency table.

DESCRIPTION OF THE PREFERRED EMBODIMENTS

Figure 1:
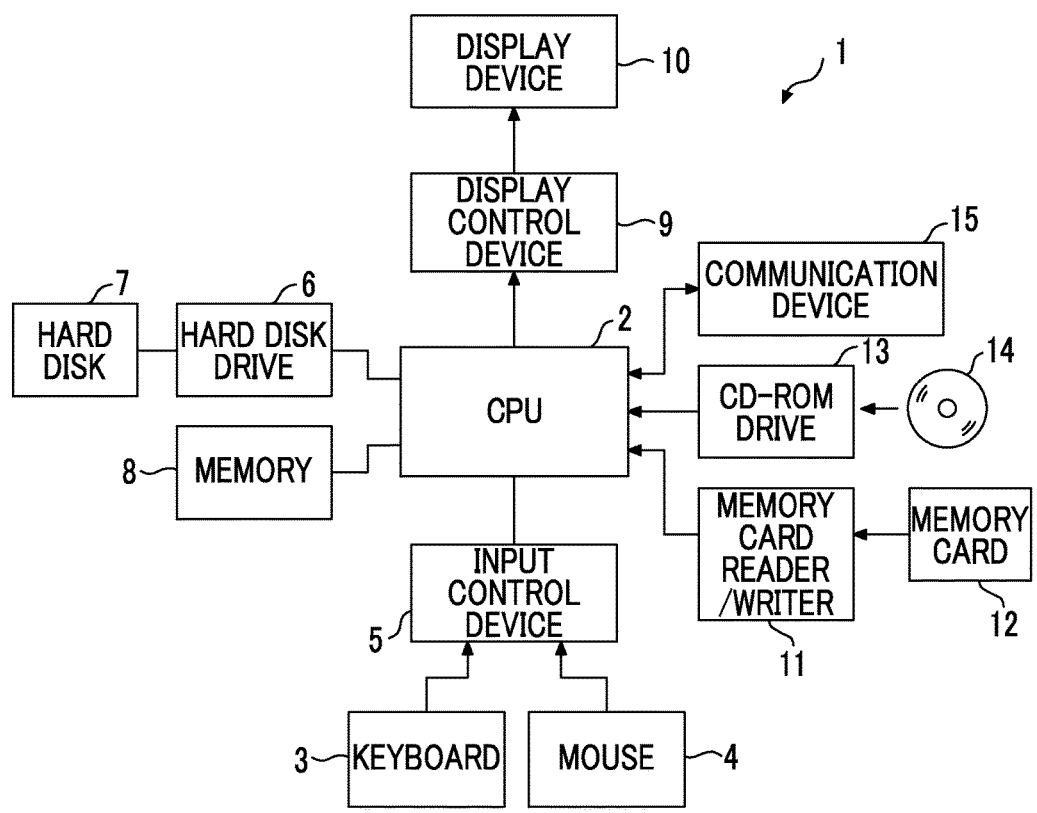
FIG. 1 is a block diagram illustrating an image display control system.

FIG. 1 illustrates an embodiment of the invention and is a block diagram illustrating the electric configuration of an image display control system 1.

The overall operation of the image display control system 1 is controlled by a central processing unit (CPU) 2.

The image display control system 1 includes a keyboard 3 and a mouse 4 as an input device for inputting commands to the image display control system 1. For example, the commands input through the keyboard 3 and the mouse 4 are transmitted to the CPU 2 through an input control device 5. In addition, the image display control system 1 includes a memory 8 that temporarily stores, for example, data, a hard disk 7, a hard disk drive 6 for accessing the hard disk 7, a display device 10, and a display control device 9 for controlling the display device 10.

The image display control system 1 further includes a memory card reader/writer 11 for accessing a memory card 12, a compact disc read only memory (CD-ROM) drive 13 for accessing a CD-ROM 14, and a communication device 15 for connection to a network such as the Internet.

The CD-ROM drive 13 reads the CD-ROM 14 (recording medium) storing a program that controls an operation which will be described below and the read program is installed in the image display control system 1. The program may be stored in a portable recording medium, such as the memory card 12, other than the CD-ROM 14 or may be installed in the image display control system 1 in advance. In addition, the communication device 15 may receive the program through the network, such as the Internet, and the received program may be installed in the image display control system 1.

The image display control system 1 illustrated in FIG. 1 includes the display device 10. However, the image display control system 1 may not necessarily include the display device 10. A display device that can be connected to the image display control system 1 may be connected to the image display control system 1 and the image display control system 1 may control the display device.

Figure 2:
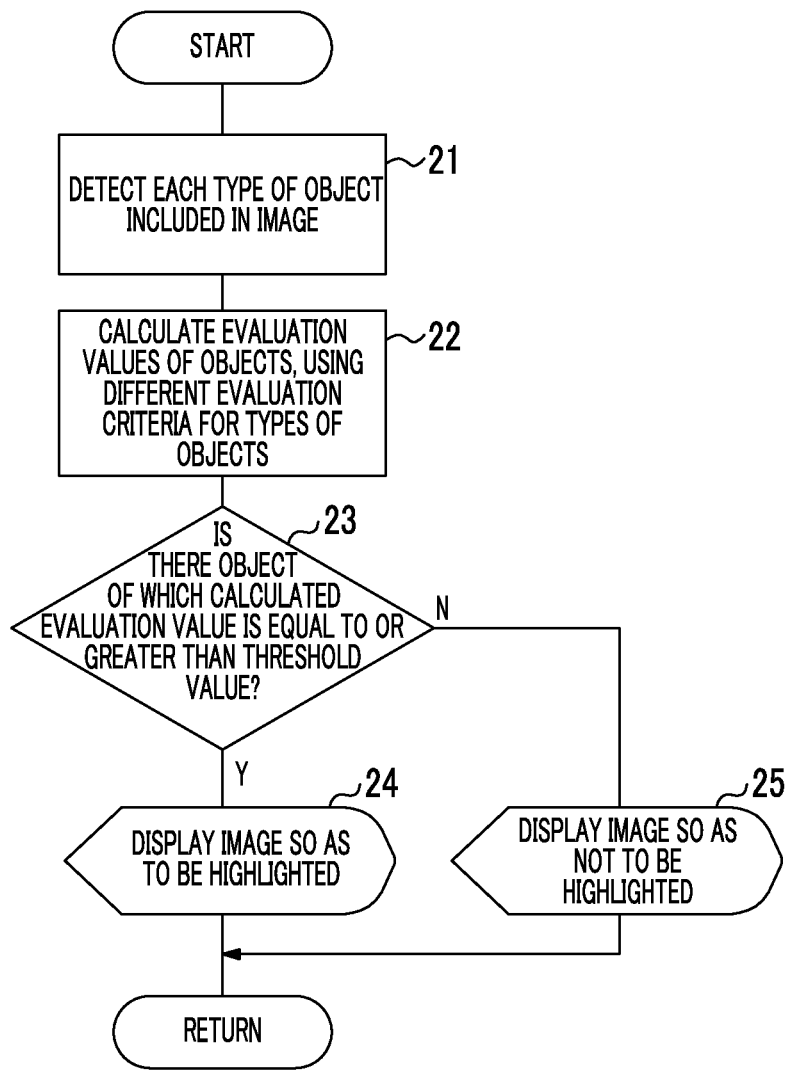
FIG. 2 is a flowchart illustrating the procedure of the image display control system.

FIG. 2 is a flowchart illustrating the procedure of the image display control system 1.

In the procedure illustrated in FIG. 2, the evaluation values of objects included in an image are calculated, using different evaluation criteria for the types of objects, and an image including an object of which the calculated evaluation value is equal to or greater than a threshold value is displayed so as to be more highlighted than an image that does not include the object of which the calculated evaluation value is equal to or greater than the threshold value.

The memory card 12 storing an image file is inserted into the image display control system 1 and the memory card reader/writer 11 reads the image file from the memory card 12. The CPU 2 (an object detection device) detects each type of object (a plurality of objects) included in an image indicated by the read image file (Step 21).

Figure 3:
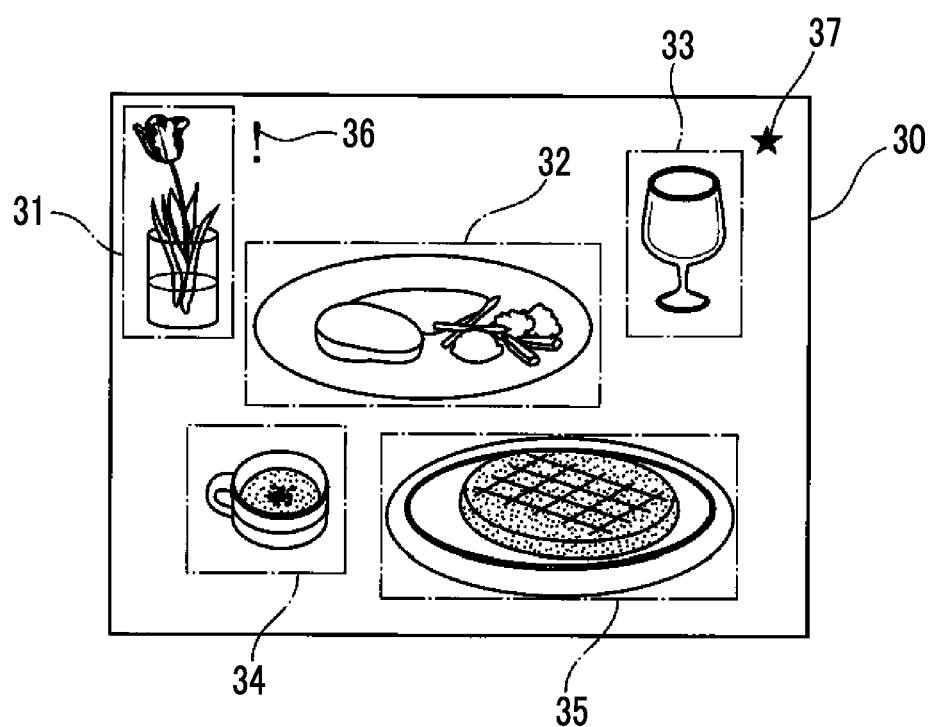
FIG. 3 illustrates an example of an image.

FIG. 3 illustrates an example of an image 30 indicated by the image file read from the memory card 12.

The image 30 includes a flower 31, a drink 33, and dishes 32, 34, and 35. The flower 31, the drink 33, and the dishes 32, 34, and 35 are detected by a process of detecting objects included in the image 30 by the CPU 2. Frames are displayed in the detected flower 31, drink 33, and dishes 32, 34, and 35. However, the frames may not be displayed. Pattern matching may be used as the object detection process. In addition, the concept of the type of object to be detected may be determined by the user. For example, when the object detected as the dish 32 is salad, salad which is subordinate to the dish 32 may be detected us the object. When the object detected as the dish 34 is soup, soup which is subordinate to the dish 34 may be detected as the object. When the object detected as the dish 35 is steak, meat or steak which is subordinate to the dish 35 may be detected as the object. Similarly, the object detected as the flower 31 may be a specific type of flower. In addition, when the object detected as the drink 33 is wine, wine which is subordinate to the drink 33 may be detected as the object. Similarly, the drink 33 may be detected as food.

Returning to FIG. 2, when each type of object, that is, the flower 31, the drink 33, and the dishes 32, 34, and 35 are detected from the image 30, the CPU 2 (an evaluation value calculation device) calculates the evaluation values of the objects, using different evaluation criteria for the types of objects (Step 22). Then, the evaluation value of the flower 31 is calculated using evaluation criteria for a flower, the evaluation value of the drink 33 is calculated using evaluation criteria for a drink, and the evaluation values of the dishes 32, 34, and 35 are calculated using evaluation criteria for food. The evaluation point of view varies depending on the type of object. Therefore, it is possible to evaluate the objects using the evaluation criteria suitable for each type of object. For example, when the type of object is a flower, chroma has priority over the degree of focus and a flower with a vivid color or a flower in focus in an image in which the background is out of focus has a high evaluation value. When the type of object is a drink, for example, a drink in a glass having drops of water formed thereon which is clearly captured so as to look delicious or a drink which is obliquely captured such that the entire drink is seen has a high evaluation value. When the type of object is food and an image of food is captured under a fluorescent light, the influence of the fluorescent light is removed such that food looks delicious and food which is captured in a color environment close to natural light has a high evaluation value. As such, the evaluation criteria which vary depending on the type of object are determined in advance and the CPU 2 calculates the evaluation value of each type of object on the basis of the evaluation criteria.

When the evaluation value of each type of object is calculated, the CPU 2 determines whether there is an object of which the calculated evaluation value is equal to or greater than the threshold value (Step 23). Since the evaluation criteria vary depending on the type of object, the threshold value also varies depending on the type of object. However, the same threshold value may be used, regardless of the type of object.

For an image including an object of which the calculated evaluation value is equal to or greater than the threshold value (YES in Step 23), the display control device 9 displays the image so as to be highlighted (Step 24).

For example, when at least one of the calculated evaluation values of the flower 31, the drink 33, and the dishes 32, 34, and 35 included in the image 30 is equal to or greater than the threshold value, the image 30 is displayed so as to be highlighted. However, the image 30 may not be highlighted and an object with an evaluation value equal to or greater than the threshold value may be more highlighted than an object with an evaluation value less than the threshold value.

In this embodiment, it is assumed that, among the flower 31, the drink 33, and the dishes 32, 34, and 35 included in the image 30, the evaluation values of the flower 31 and the drink 33 are equal to or greater than the threshold value. The image 30 is displayed so as to be highlighted by putting an exclamation mark 36 in the vicinity of the flower 31 and putting a star mark 37 in the vicinity of the drink 33. In a case in which the evaluation values of the flower 31 and the drink 33 are equal to or greater than the threshold value, the image 30 may be displayed so as to be highlighted by putting any mark (one mark or a plurality of marks; in a case of a plurality of marks, different marks for each type of object or the same mark regardless of the type of object) in the image 30 or in the vicinity of the image 30. In addition, the flower 31 and the drink 33 may be displayed so as to be more highlighted than the dishes 32, 34, and 35, without any mark, or the image 30 may be displayed so as to be highlighted.

In the example illustrated in FIG. 3, the exclamation mark 36 is put to the flower 31 and the star mark 37 is put to the drink 33. However, in a case in which there is an object of which the calculated evaluation value is equal to or greater than the threshold value as described above, the image 30 may be displayed such that each type of object is displayed in different modes. In addition, the image 30 may be displayed so as to be highlighted in different modes as follows: the brightness of the flower 31 which is an object with an evaluation value equal to or greater than the threshold value is higher than that of other objects, such as the dishes 32, 34, and 35, and the drink 33 which is an object with an evaluation value equal to or greater than the threshold value is surrounded by a frame. Alternatively, the image 30 may be displayed so as to be highlighted by relatively increasing the brightness of both the flower 31 and the drink 33.

In a case in which there is no object with the calculated evaluation value equal to or greater than the threshold value (NO in Step 23), the display control device 9 displays the image so as not to be highlighted (Step 25).

In the above-described embodiment, one image 30 has been described. However, when there are a plurality of images, similarity, the images may be displayed so as to be highlighted. In this case, an image that includes an object of which the calculated evaluation value is equal to or greater than the threshold value may be displayed so as to be more highlighted than an image that does not include the object of which the calculated evaluation value is equal to or greater than the threshold value.

FIGS. 4 to 7 are diagrams illustrating another embodiment and illustrate an example of a case in which a plurality of images are treated.

Figure 4:
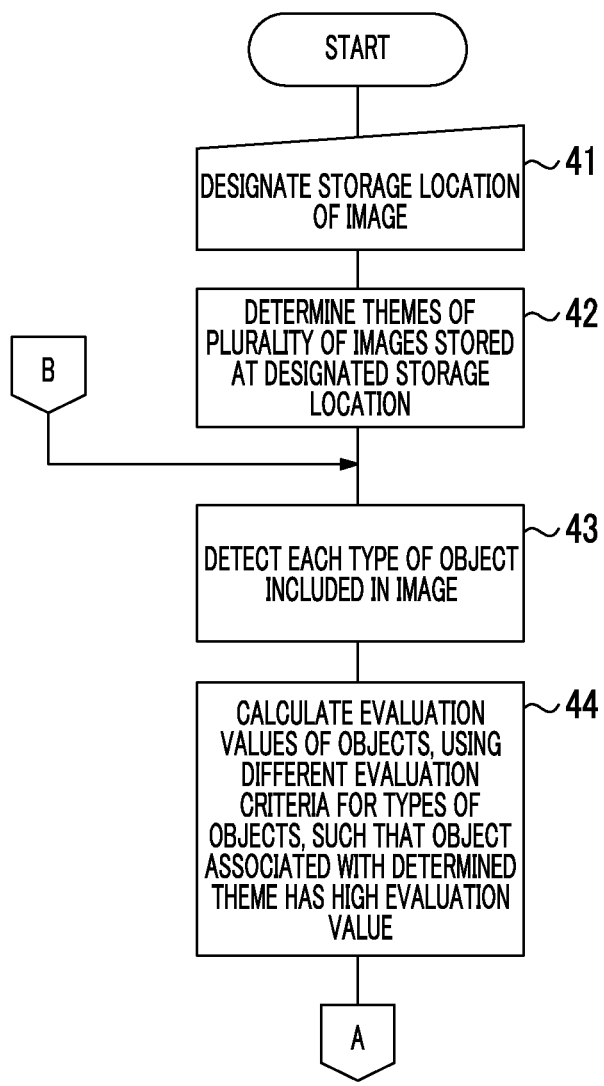
FIG. 4 is a flowchart illustrating the procedure of the image display control system.
Figure 5:
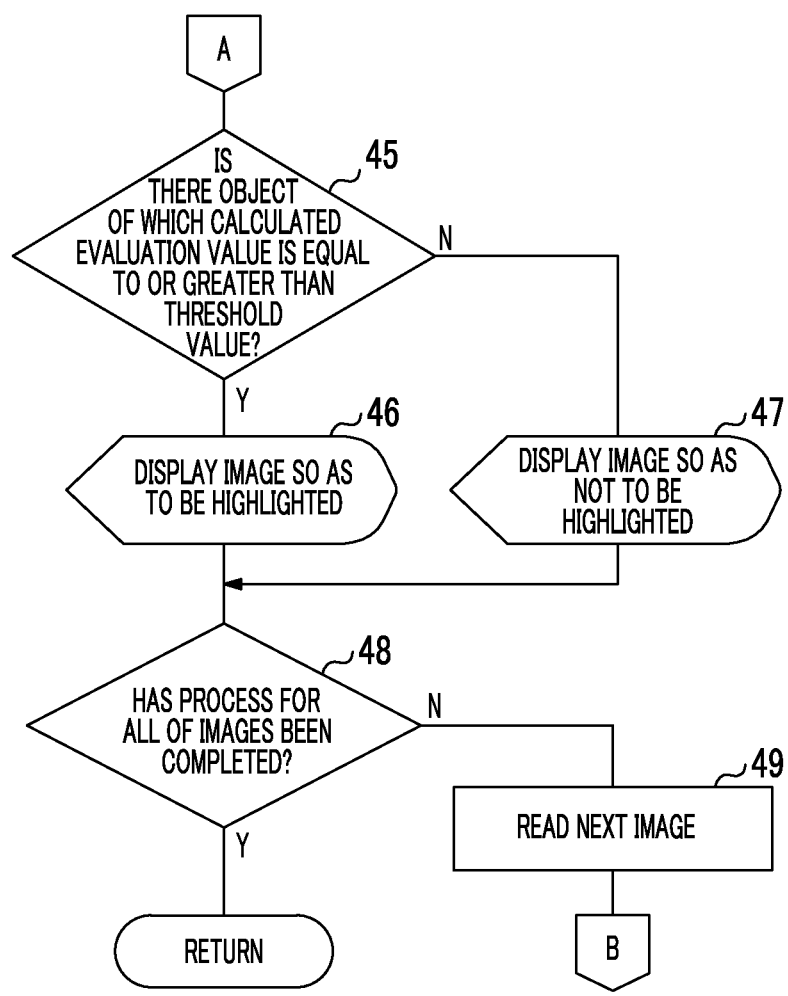
FIG. 5 is a flowchart illustrating the procedure of the image display control system.

FIGS. 4 and 5 are flowcharts illustrating the procedure of the image display control system 1.

In this embodiment, it is assumed that the user takes a plurality of images with a certain theme. However, the invention is not necessarily limited to this case. For example, in a case in which the user travels and takes pictures at a travel destination and in a case in which the user attends a wedding and takes pictures in a wedding hall, the theme is travel and a wedding. The user may take pictures with an intended theme or may take pictures with an unintended theme.

The user designates an image storage location where a plurality of images are stored (Step 41). For example, in a case in which an image file indicating a plurality of images captured at a travel destination by the user who has traveled is stored in the memory card 12, the user designates the memory card 12 as the storage location. The image storage location is not limited to the memory card 12 and may be other recording media or a storage area of a server that can be accessed through the Internet. For example, a plurality of storage locations are displayed on a display screen of the display device 10 and the user designates a storage location using the keyboard 3 or the mouse 4.

Then, the theme of a plurality of images stored at the designated storage location is determined (Step 42). The theme may be determined by the CPU 2 (a theme determination device) or may be input by the user through the keyboard 3 (a theme determination device) or the mouse 4 (a theme determination device). In a case in which the theme of a plurality of images is determined by the CPU 2, for example, each of the plurality of images is analyzed and the theme is determined on the basis of an object included in the analyzed image. In a case in which there are many images including objects that are considered as a part of landscape, such as a mountain, a river, the sea, a lake, a shrine, and a temple, travel is determined as the theme. In a case in which there are many images including objects, such as a wedding dress, a ring, and a bouquet, a wedding is determined as the theme.

In a case in which an album (including an electronic album) is generated from a plurality of images stored at the storage location, the theme of the generated album may be determined from the plurality of images. An object with a high evaluation value is detected according to the theme of the album, which will be described below.

When the theme is determined, the CPU 2 detects each type of object included in each of the plurality of images, using the same method as described above (Step 43). Then, the CPU 2 calculates the evaluation values of the detected objects, using the evaluation criteria in which an object of a type associated with the determined theme has a higher evaluation value than an object of a type other than the type associated with the determined theme (Step 44).

Figures 6, 7:
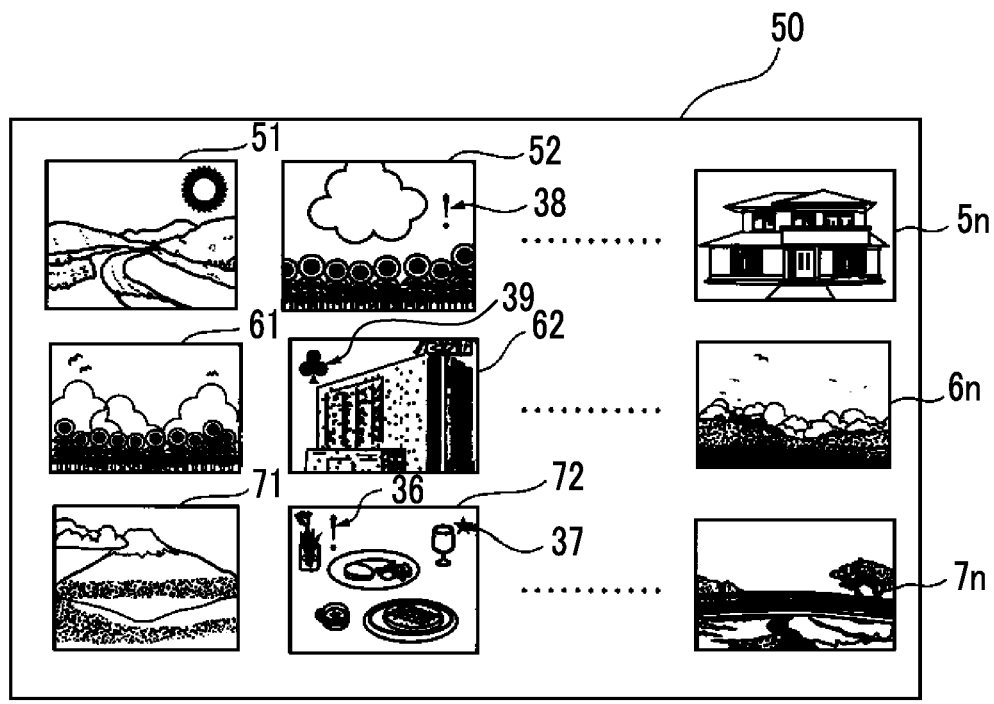
FIG. 6 illustrates an example of a theme table.
FIG. 7 illustrates an example of an image list display window.

FIG. 6 illustrates an example of a theme table stored in the memory 8.

In the theme table, the type of object corresponding to a theme is stored for each theme. For example, for a travel theme, a mountain, a lake, a shrine, a flower, and food are stored as the type of object corresponding to the theme in the theme table. For a wedding theme, for example, a dress, a ring, a bouquet, and food are stored as the type of object corresponding to the theme in the theme table. For an entrance ceremony theme, for example, a school back and a school gate are stored as the type of object corresponding to the theme in the theme table.

For example, when the theme of a plurality of images is determined as travel, the evaluation values of the objects are calculated using different evaluation criteria for the types of objects such that objects of a type which is stored so as to be associated with the theme, such as a mountain and a lake, have a higher evaluation value than objects of types which are not stored so as to be associated with the theme (Step 44). The object of the type associated with the theme may have a relatively high evaluation value. Therefore, after the evaluation values are calculated, the evaluation value of the object of the type associated with the theme may be corrected to increase.

Then, the CPU 2 determines whether an image includes an object of which the calculated evaluation value is equal to or greater than the threshold value, using the same method as described above (Step 45). In a case in which an image includes an object of which the calculated evaluation value is equal to or greater than the threshold value (YES in Step 45), the image is displayed so as to be highlighted (Step 46). In a case in which an image does not include the object of which the calculated evaluation value is equal to or greater than the threshold value (NO in Step 45), the image is displayed so as not to be highlighted (Step 47).

When the process for all of the plurality of images has not been completed (NO in Step 48), the next image file is read from the memory card 12 and the process after Step 43 is repeated. When the process for the plurality of images has been completed (YES in Step 48), the process illustrated in FIGS. 4 and 5 ends.

FIG. 7 illustrates an example of a display screen displayed on the basis of the process illustrated in FIGS. 4 and 5.

An image list display window 50 is displayed on the display screen of the display device 10.

Thumbnail images 51 to 5n, 61 to 6n, and 71 to 7n (or images other than the thumbnail images) of a plurality of images indicated by a plurality of image files which are stored at the storage location (in this example, the memory card 12) designated by the user are displayed in the image list display window 50. All or some of the thumbnail images of the images indicated by the image files which are stored at the storage location designated by the user may be displayed in the image list display window 50. In a case in which some of the thumbnail images are displayed, the thumbnail images are scrolled such that the thumbnail images which have not been displayed are displayed.

Among the thumbnail images 51 to 5n, 61 to 6n, and 71 to 7n of the plurality of images, a flower included in the thumbnail image 52 has an evaluation value equal to or greater than the threshold value and an exclamation mark 38 is put to the thumbnail image 52 to highlight the thumbnail image 52 (as such, an image indicated by an image file may not be highlighted, but a thumbnail image may be highlighted). Similarly, a building included in the thumbnail image 62 has an evaluation value equal to or greater than the threshold value and a clover mark 39 is put to the thumbnail image 62 to highlight the thumbnail image 62. The thumbnail image 72 is of the image 30 illustrated in FIG. 3. An exclamation mark 36 and a star mark 37 are put to a flower and a drink in the thumbnail image 72 to highlight the thumbnail image 72, respectively.

Figure 8:
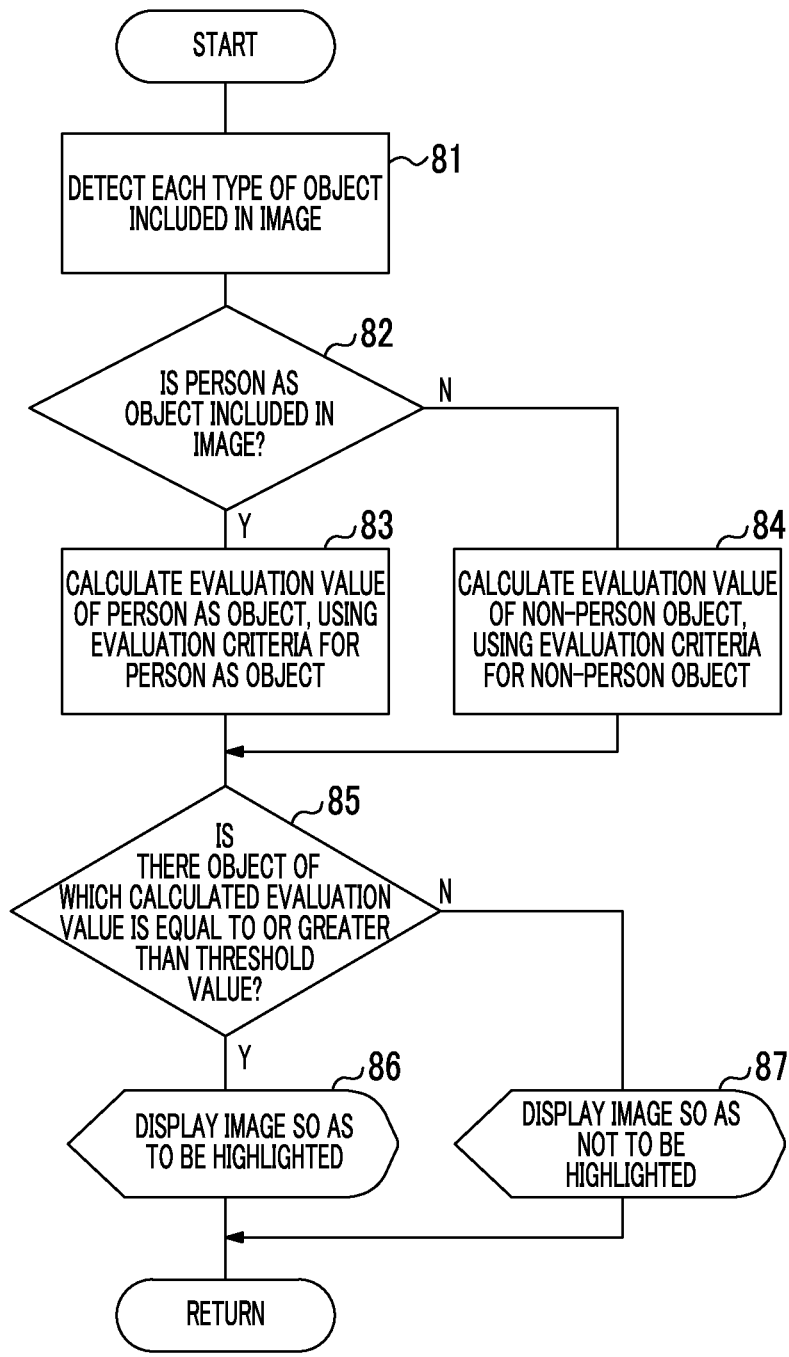
FIG. 8 is a flowchart illustrating the procedure of the image display control system.
Figure 9:
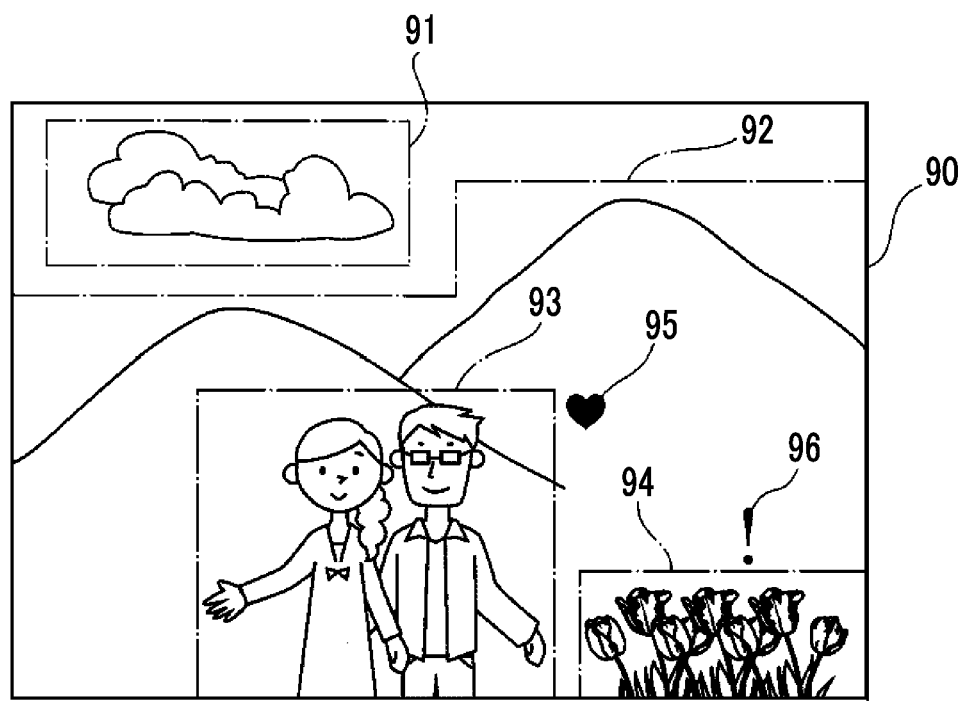
FIG. 9 illustrates an example of an image.

FIGS. 8 and 9 are diagrams illustrating stall another embodiment and illustrate an example of a case in which a person is included as the type of object in an image.

FIG. 8 is a flowchart illustrating the procedure of the image display control system 1.

As described above, the CPU 2 detects each type of object included in an image (Step 81).

Then, the CPU 2 determines whether a person is included as the object in the image (Step 82).

In a case in which a person is included as the object (YES in Step 82), the evaluation value of the person as the object is calculated using the evaluation criteria for the person as the object (Step 83). In a case in which an object other than the person is included in the image including the person, the evaluation value of the object is calculated using the evaluation criteria corresponding to the type of the object other than the person. In addition, in a case in which a person is included in the image, the calculation of the evaluation value of an object other than the person may be stopped since priority is given to the evaluation of the person.

In a case in which a person is not included as the object in the image (NO in Step 82), the CPU 2 calculates the evaluation value of a non-person object, using the evaluation criteria for the non-person object (Step 84). For the object other than a person, the evaluation value of the non-person object may be calculated, using common evaluation criteria for the non-person object, regardless of the type of object. Alternatively, the evaluation values of the non-person objects may be calculated using different evaluation criteria for the types of objects.

Then, as described above, the CPU 2 determines whether there is an object of which the calculated evaluation value is equal to or greater than the threshold value (Step 85). The threshold value of the evaluation value in a case in which the object is a person may be different from or equal to the threshold value of the evaluation value in a case in which the object is not a person.

In a case in which there is an object of which the calculated evaluation value is equal to or greater than the threshold value (YES in Step 85), the image including the object is highlighted (Step 86). In a case in which there is no object with the calculated evaluation value equal to or greater than the threshold value (NO in Step 85), the image is displayed so as not to be highlighted (Step 87).

FIG. 9 illustrates an example of an image.

An image 90 includes a cloud 91, a mountain 92, a person 93, and a flower 94. The CPU 2 detects the cloud 91, the mountain 92, the person 93, and the flower 94. As described above, the CPU 2 calculates the evaluation value of the person 93 using the evaluation criteria for a person. For the evaluation criteria for a person, the evaluation value varies depending on whether brightness is appropriate or whether a person is in focus. In addition, for example, a person with a smiling face has a high evaluation value. A person closer to the center of the image has a higher evaluation value. Alternatively, a person whose whole face is seen or who opens the eyes has a high evaluation value. In the example illustrated in FIG. 9, the evaluation value of the person 93 is determined to be equal to or greater than the threshold value and a heart mark 95 is put in the vicinity of the person 93. The image 90 is highlighted by the heart mark 95.

For the cloud 91, the mountain 92, and the flower 94 other than the person, the evaluation values thereof are uniformly calculated by the evaluation criteria for the non-person object. However, in a case in which non-person objects are classified according to the type of object, the evaluation values of the detected objects may be calculated, using different evaluation criteria for the classified types of objects. That is, the evaluation values of the cloud 91, the mountain 92, and the flower 94 may be calculated using different evaluation criteria for the types of non-person objects. Since the evaluation value of the flower 94 is equal to or greater than the threshold value, an exclamation mark 96 is put in the vicinity of the flower 94.

The user sees the heart mark 95 to recognize that the evaluation value of the person 93 is high and sees the exclamation mark 96 to recognize that the evaluation value of the flower 94 is high. As such, the image 90 may be displayed such that the person 93 as the object of which the calculated evaluation value is equal to or greater than the threshold value and the flower 94 as the object other than a person, of which the calculated evaluation value is equal to or greater than the threshold value, are displayed in different modes. As described above, in a case in which the person 93 is included in the image 90, priority may be given to the evaluation of the person 93 and the calculation of the evaluation value of an object other than the person 93 may be stopped. In addition, a heart mark 95 indicating that the evaluation value of the person 93 is high may not be put in the vicinity of the person 93 and may be displayed at any position of the image 90 or in the vicinity of the image 90. Further, even in a case in which the evaluation value of the person 93 is equal to or greater than the threshold value, the heart mark 95 may not be displayed and the brightness of the image 90 may be increased or the image 90 may be surrounded by a frame to highlight the image 90. Furthermore, the brightness of the person 93 may be increased or the person 93 may be surrounded by a frame to highlight the image 90.

As such, the types of objects include a person as the object and a non-person object and the evaluation values of the detected objects may be calculated using different evaluation criteria for the person as the object and the non-person object. In addition, as described above, in a case in which an image includes a person as the object, the evaluation value of the person as the object may be calculated using the evaluation criteria for the person as the object. In a case in which an image does not include a person as the object, the evaluation value of a non-person object may be calculated using the evaluation criteria for the non-person object.

Figure 10:
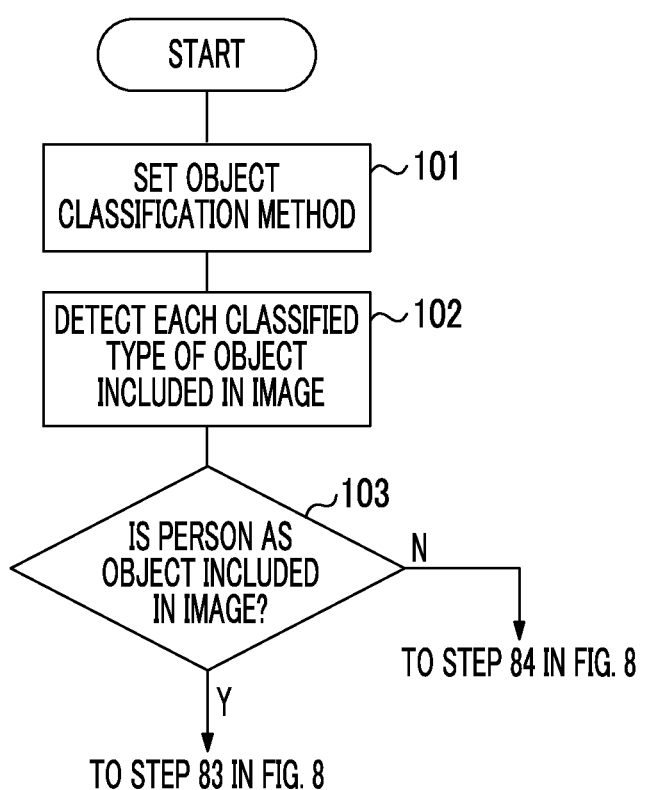
FIG. 10 is a flowchart illustrating a portion of the procedure of the image display control system.

FIG. 10 illustrates yet another embodiment and is a flowchart illustrating a portion of the procedure of the image display control system 1.

In this embodiment, the user can set an object type classification method. Examples of the object type classification method include a method that classifies objects into persons and non-person objects and a method that classifies objects into persons and non-person objects and further classifies the non-person objects according to the type of object. The user sets an object classification method, using the keyboard 3 (a classification method setting device) (Step 101).

When the object classification method is set, the CPU 2 detects objects included in an image for each of the classified types of objects (Step 102). Then, the CPU 2 determines whether a person is included as the object in the image as in Step 82 illustrated in FIG. 8 (Step 103). When a person is included as the object (YES in Step 103), the process proceeds to Step 83 in FIG. 8. When no person is included as the object (NO in Step 103), the process proceeds to Step 84 in FIG. 8.

In this case, as illustrated in FIG. 9, the person as the object and the non-person object which have an evaluation value equal to or greater than the threshold value may be displayed in different modes or the nonperson objects classified in different types may be displayed in different modes.

Figure 11:
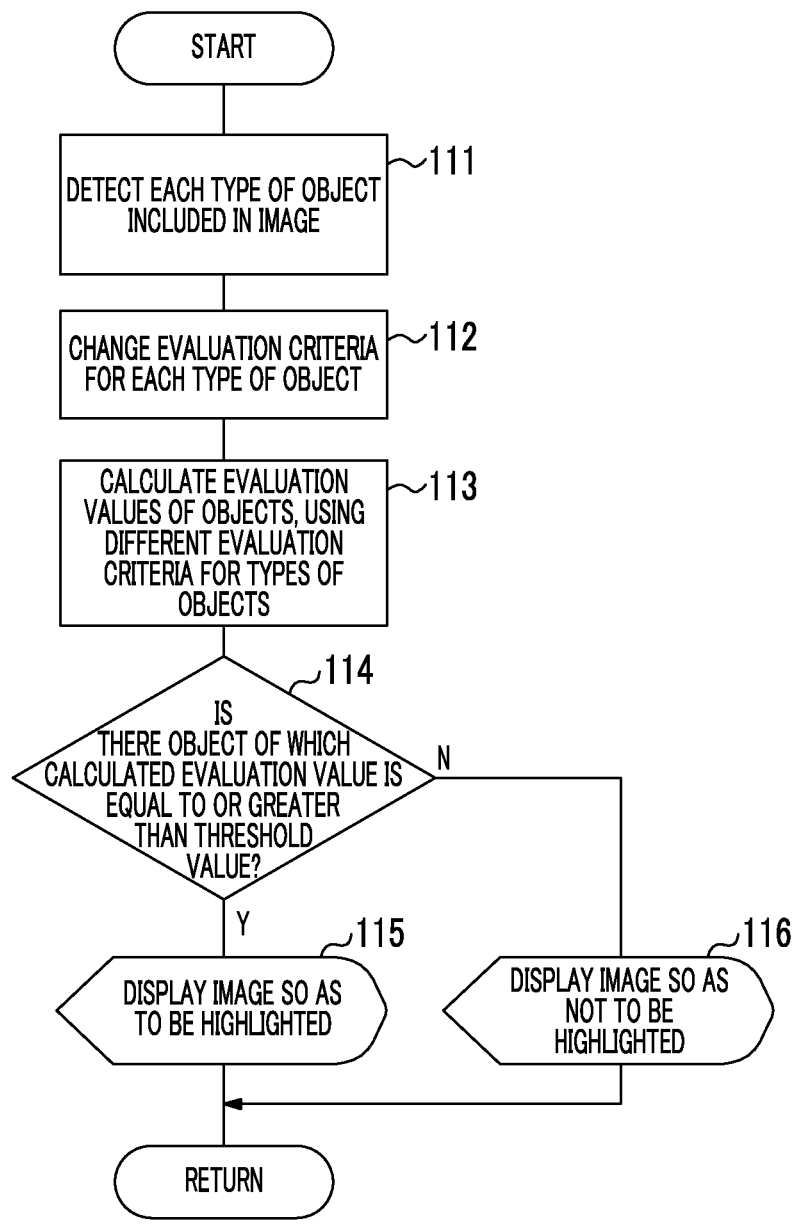
FIG. 11 is a flowchart illustrating the procedure of the image display control system.

FIG. 11 illustrates still yet another embodiment and is an example of a flowchart illustrating the procedure of the image display control system 1.

The CPU 2 detects each type of object included in an image (Step 111). The detected types of objects are displayed on the display screen of the display device 10 and the user changes the evaluation criteria for each type of object while viewing the type of object (Step 112). For example, the user changes the evaluation criteria such that the evaluation value of the object in which the user is not interested is low and the evaluation value of the object of the type in which the user is interested is high. The user changes the evaluation criteria, using, for example, the keyboard 3 (an evaluation criterion change device). The type of object may not be displayed on the display screen of the display device 10 and the evaluation criteria for each type of object may be changed. Alternatively, before each type of object is detected, the evaluation criteria for each type of object may be changed. For example, in a case in which the evaluation value is calculated using a coefficient, the coefficient may be changed to change the evaluation criteria or the threshold value of each type of object may be changed to change the evaluation criteria. In addition, a method for classifying objects into types may be set (Step 101 in FIG. 10) and the evaluation criteria for each of type of object classified by the set classification method may be changed.

Then, as in the process after Step 22 in FIG. 2, the CPU 2 calculates the evaluation values of the objects using the evaluation criteria that vary depending on the type of object (Step 113). In a case in which the image includes an object of which the calculated evaluation value is equal to or greater than the threshold value (YES in Step 114), the image is displayed so as to be highlighted (Step 115). In a case in which the image does not include the object of which the calculated evaluation value is equal to or greater than the threshold value (NO in Step 114), the image is displayed so as not to be highlighted (Step 116).

Figure 12:
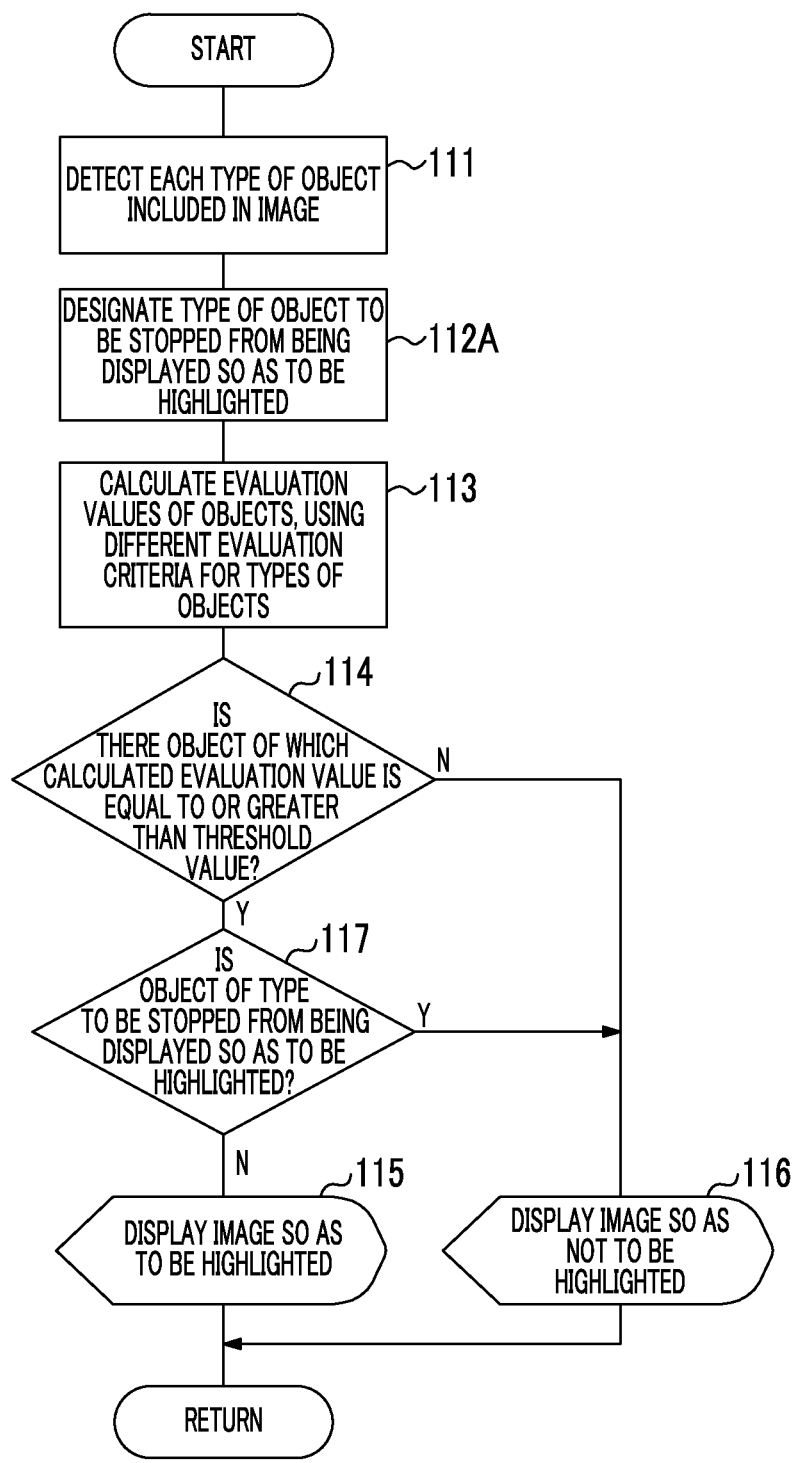
FIG. 12 is a flowchart illustrating the procedure of the image display control system.

FIG. 12 illustrates yet still another embodiment and is a flowchart illustrating the procedure of the image display control system 1. In FIG. 12, the same processes as those illustrated in FIG. 11 are denoted by the same reference numerals and the description thereof will not be repeated.

As described above, the CPU 2 detects each type of object included in an image (Step 111). The user designates a type of object using the keyboard 3 (a type designation device) such that, even when the evaluation value of the object is equal to or greater than the threshold value, the image is stopped from being displayed so as to be highlighted (Step 112A). The types of objects may be displayed on the display screen of the display device 10 and, among the displayed types of objects, the type of object of which the evaluation value is equal to or greater than the threshold value and is stopped from being displayed so as to be highlighted may be designated. In addition, before each type of object included in the image is detected, the type of object may be designated such that, even when the evaluation value of the object is equal to or greater than the threshold value, the image is stopped from being displayed so as to be highlighted.

When the evaluation values of the objects are calculated using different evaluation criteria for the types of objects (Step 113), in a case in which the image includes an object of which the calculated evaluation value is equal to or greater than the threshold value (YES in Step 114), the CPU 2 determines whether the object with the evaluation value equal to or greater than the threshold value is a type that is stopped from being displayed so as to be highlighted (Step 117). When the object with the evaluation value equal to or greater than the threshold value is the type that is stopped from being displayed so as to be highlighted (YES in Step 117), the image is displayed so as not to be highlighted (Step 116). When the object with the evaluation value equal to or greater than the threshold value is not the type that is stopped from being displayed so as to be highlighted (NO in Step 117), the image is displayed so as to be highlighted (Step 115).

Figure 13:
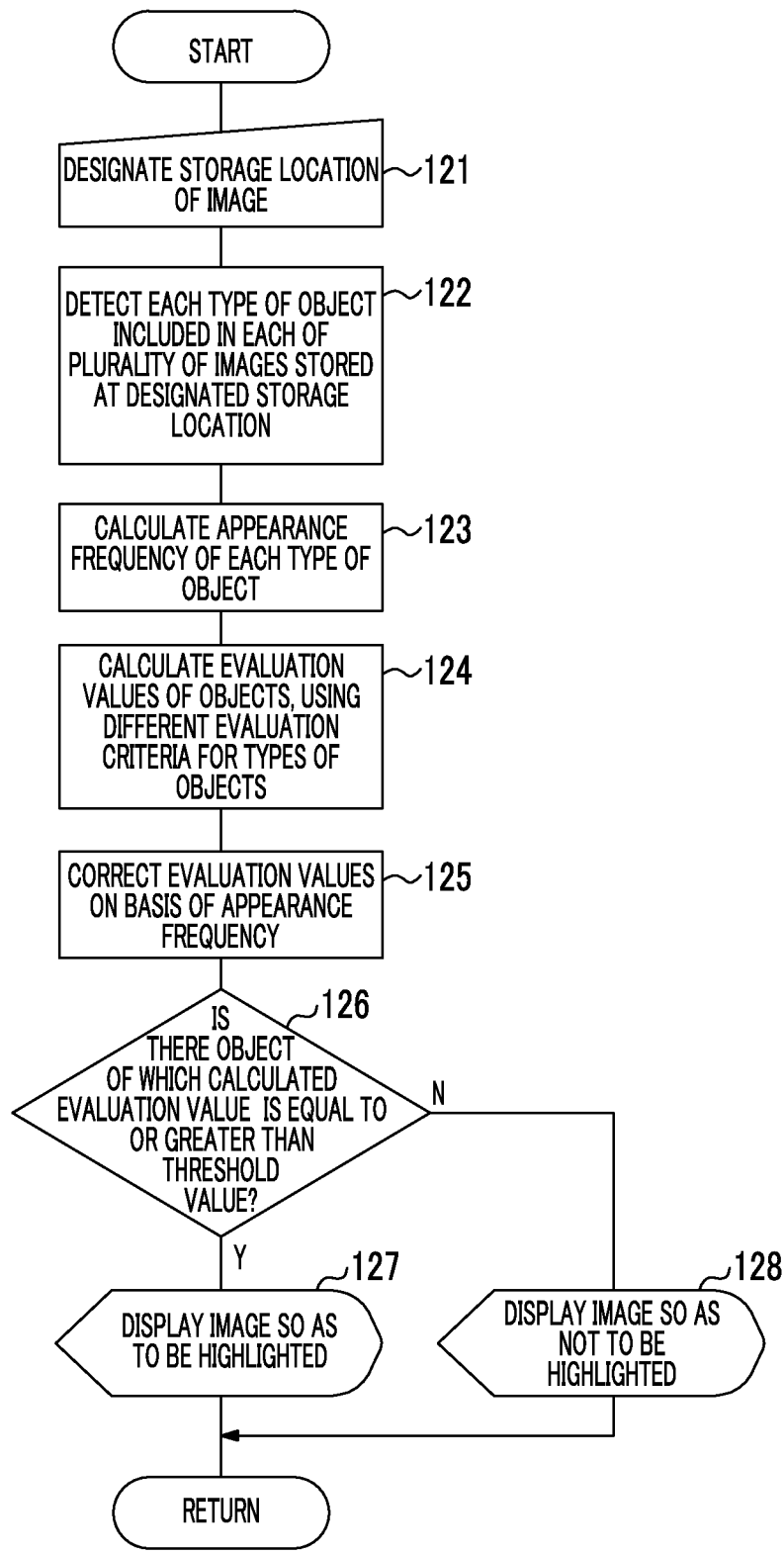
FIG. 13 is a flowchart illustrating the procedure of the image display control system.

FIG. 13 illustrates still yet another embodiment and is an example of a flowchart illustrating the procedure of the image display control system 1.

The user designates the storage location where a plurality of images are stored as in Step 41 of FIG. 4 (Step 121). The CPU 2 detects each type of object included in each of the plurality of images stored at the designated storage location (Step 122).

Then, the CPU 2 (an appearance frequency calculation device) calculates the appearance frequency of each type of object included in the plurality of images (Step 123).

FIG. 14 illustrates an example of an appearance frequency table.

In the appearance frequency table, the appearance frequency and a correction coefficient are stored for each type of detected object. The appearance frequency indicates the number of objects that appear in a plurality of images. The correction coefficient is used to correct the calculated evaluation value of the object. In a case in which the appearance frequency is greater than a threshold value (appearance frequency threshold value), the correction coefficient is used to correct the evaluation value of the object so as to be greater than that in a case in which the appearance frequency is less than the threshold value. In general, a photographer considers that the object that appears frequently is an important object. Therefore, the evaluation value of the object is increased. For example, in a case in which the type of object is a mountain, the appearance frequency is 123/N (where N is the number of images), which indicates that 123 mountains appear as the objects in N images. The correction coefficient for the mountain as the object is k1. The calculated evaluation value is corrected using the correction coefficient.

Returning to FIG. 13, the CPU 2 calculates the evaluation values of the detected objects, using different evaluation criteria for the types of objects (Step 124). The CPU 2 corrects the calculated evaluation values on the basis of the appearance frequencies corresponding to the evaluation values (Step 125).

When the image includes an object of which the corrected evaluation value is equal to or greater than the threshold value (YES in Step 126), the image is displayed so as to be highlighted (Step 127). When the image does not include the object of which the corrected evaluation value is equal to or greater than the threshold value (NO in Step 126), the image is displayed so as not to be highlighted (Step 128).

In the above-described embodiment, after the evaluation value is calculated, correction is performed to calculate the evaluation value such that, in a case in which the appearance frequency is greater than the threshold value, the evaluation value is greater than that in a case in which the appearance frequency is less than the threshold value. However, the evaluation value may be calculated using the evaluation criteria in which, in a case in which the appearance frequency is greater than the threshold value, the evaluation value is greater than that in a case in which the appearance frequency is less than the threshold value.

FIGS. 15 to 18 illustrate still another embodiment.

In this embodiment, the user designates an image including a person and non-person images related to the person are displayed around the image.

Figure 15:
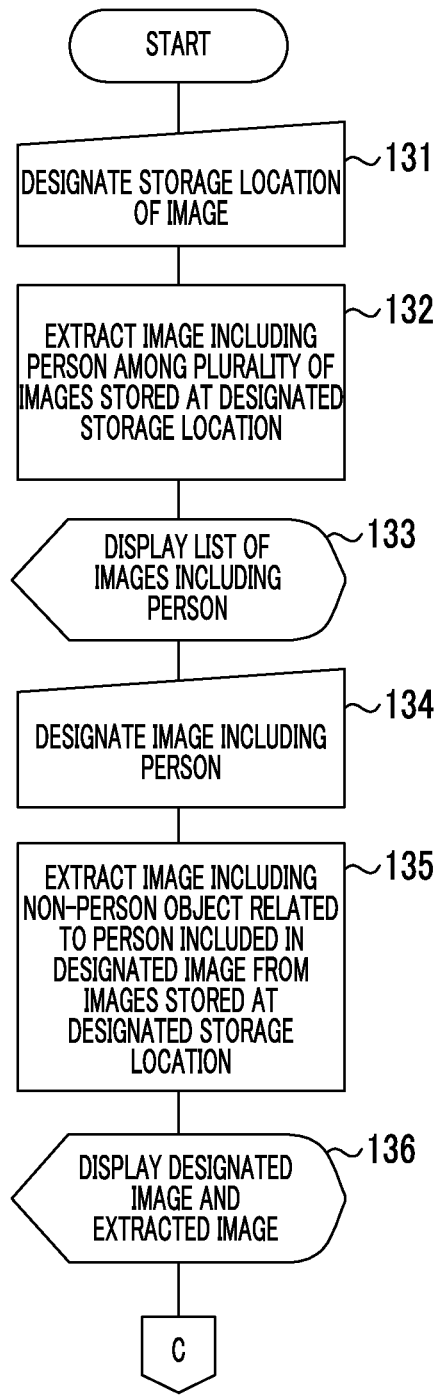
FIG. 15 is a flowchart illustrating the procedure of the image display control system.
Figure 16:
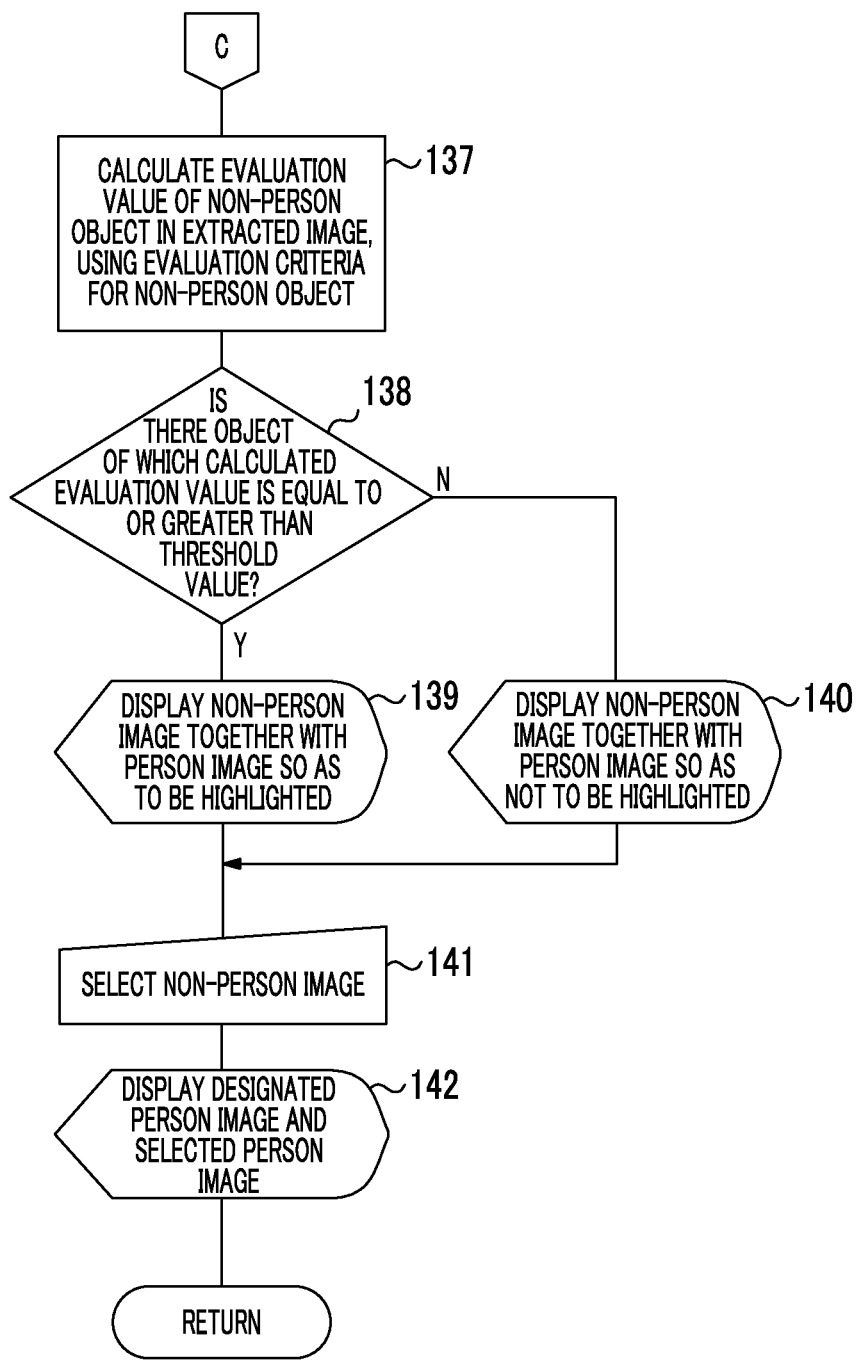
FIG. 16 is a flowchart illustrating the procedure of the image display control system.

FIGS. 15 and 16 are flowcharts illustrating the procedure of the image display control system 1.

The user designates the storage location where a plurality of images are stored (Step 131). The CPU 2 extracts an image including a person among the plurality of images stored at the designated storage location from the storage location (Step 132). The display control device 9 displays a list of the images including the person on the display screen of the display device 10 (Step 133). The user designates a desired image among a plurality of images including the person displayed in a list, using the mouse 4 (a designation device) (Step 134). The user may designate a desired image, not using the mouse 4 but using the keyboard 3 (a designation device) or others.

When the user designates an image including a person, the CPU 2 (an extraction device) extracts images including non-person objects related to the person included in the designated image from the plurality of images stored at the designated storage location (Step 135). The non-person objects related to the person included in the designated image are determined as follows. A non-person object, which is likely to be included in an image that is captured together with the person included in the designated image among the plurality of images, is determined as the non-person object. In addition, in case a non-person object is disposed substantially at the center of an image, it may be determined as the non-person object related to the person included in the designated image. Furthermore, among the images close to the imaging date and time of the designated image, a non-person object which is included in an image including only the non-person object may be determined as the non-person object related to the person included in the designated image.

It is preferable that an image including a non-person object related to the person included in the designated image does not include a person as the object and includes only the non-person object. However, the image may include a person as the object. In addition, only an image indicating a non-person object related to the person included in the designated image may be cut out from the image. In a case in which an image including a non-person object related to the person included in the designated image includes a person as the object, it is preferable that the person is identical to the person included in the designated image. However, the person may not be identical to the person included in the designated image. The CPU 2 can perform a face matching process to determine whether the persons are identical to each other. The user may input or designate the non-person object related to the person included in the designated image.

Then, the designated image and the extracted image are displayed on the display screen of the display device 10 (Step 136).

Figure 17:
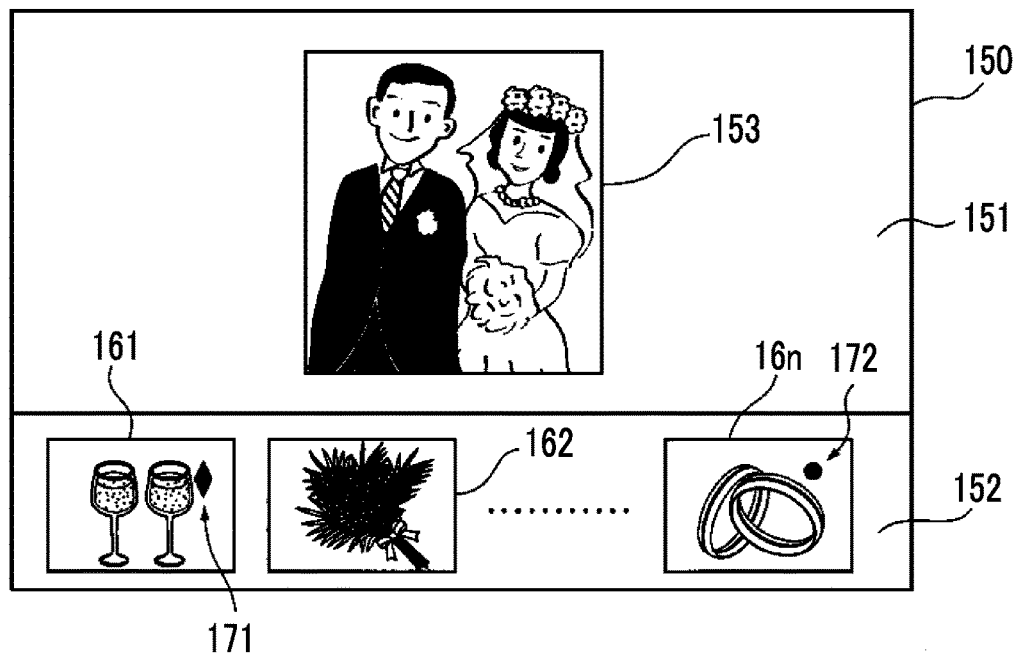
FIG. 17 illustrates an example of an image selection window.

FIG. 17 illustrates an example of an image selection window 150 displayed on the display screen of the display device 10.

The image selection window 150 includes a designated image display region 151 and an extracted image display region 152. As described above, an image 153 designated by the user is displayed in the designated image display region 151. Images 161 to 16n including a non-person object which have been extracted as described above are displayed in the extracted image display region 152. In a case in which all of the extracted images are not displayed in the extracted image display region 152, a scroll command is input through the keyboard 3 such that time images which have been extracted and have not been displayed appear in the extracted image display region 152. In this way, the designated image and the extracted images are displayed in the image selection window 150.

The CPU 2 calculates the evaluation values of the non-person objects in, for example, the extracted images 161 to 16n, using the evaluation criteria for the non-person object, with reference to FIG. 16 (Step 137). The evaluation criteria for the non-person object may be common to all of the non-persons or may vary depending on the type of non-person object. In addition, the types of non-person objects may be classified into some groups and the evaluation values of the non-person objects may be calculated, using different evaluation criteria for the groups.

The CPU 2 determines whether there is a non-person object of which the calculated evaluation value is equal to or greater than the threshold value (Step 138). In a case in which the evaluation criteria for the non-person object are common to all of the non-person objects, the threshold value may be common or may vary depending on the type of non-person object. In a case in which the evaluation criteria for the non-person object vary depending on the type of non-person object, the threshold value varies depending on the type of non-person object. However, a common threshold value may be used regardless of the type of non-person object.

A mark is put to an image including the non-person object of which the calculated evaluation value is equal to or greater than the threshold value (YES in Step 138) and the image including the non-person object is displayed together with the designated image 153 so as to be more highlighted than images that do not include the non-person object (Step 139). For example, it is assumed that the extracted image 161 includes a drink as the non-person object and the evaluation value of the drink as the object is equal to or greater than the threshold value. A diamond mark 171 is displayed in the image 161. In addition, it is assumed that the extracted image 16n includes a ring as the non-person object and the evaluation value of the ring as the object is equal to or greater than the threshold value. A black circle mark 172 is displayed in the image 16n. It is preferable that an image including an object with an evaluation value equal to or greater than the threshold value is highlighted. Therefore, no marks may be displayed and the brightness of an image may increase or the image may be surrounded by a frame such that the image is highlighted.

For an image including a non-person object with the calculated evaluation value equal to or greater than the threshold value (NO Step 138), no marks are put to the image and the image is displayed (Step 140). The image including the non-person object is displayed together with the designated image 153 so as not to be highlighted (Step 140).

The user selects a desired image (non-person image) with reference to the marks displayed in, for example, the images 161 to 16n, using the mouse 4 (a selection device) or the keyboard 3 (a selection device), while viewing the images 161 to 16n displayed in the extracted image display region 152 (Step 141). When an image change command is input to the image display control system 1 through the keyboard 3 after the desired image is selected, a related image list display window 160 illustrated in FIG. 18 is displayed on the display screen of the display device 10.

Figure 18:
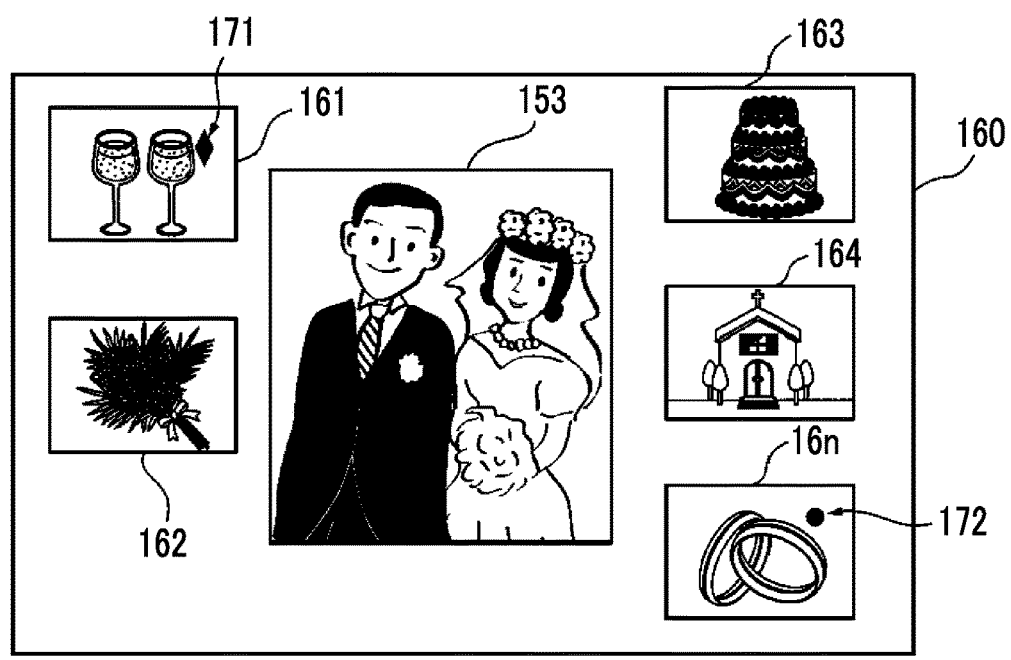
FIG. 18 illustrates an example of a related image list display window.

The image 153 designated by the user is displayed substantially at the center of the related image list display window 160, with reference to FIG. 18. The images 161, 162, 163, 164, and 16n selected from, for example, the extracted images 161 to 16n are displayed around the designated image 153. The diamond mark 171 is displayed in the image 161 and the black circle mark 172 is displayed in the image 16n. However, the diamond mark 171 and the black circle mark 172 may not be displayed in the related image list display window 160. The images 161 and 16n including the objects with an evaluation value equal to or greater than the threshold value may be displayed by other methods for displaying the diamond mark 171 and the black circle mark 172 so as to be more highlighted than other images. In this way, the designated image 153 and the selected images 161, 162, 163, 164, and 16n are displayed in the related image list display window 160 (the same region).

In FIG. 18, the selected images 161, 162, 163, 164, and 16n are displayed around the designated image 153. However, the images 153, 161, 162, 163, 164, and 16n may be displayed at any position in the related image list display window 160. Therefore, the selected images 161, 162, 163, 164, and 16n may be displayed below the designated image 153 as in the image selection window 150 illustrated in FIG. 17.

The related image list display window 160 generated in this way can be printed on one sheet, an all (electronic album) can be generated as one page of the album, or the album can be printed.

What is claimed is:

1. An image display control system comprising:
    an object detection device for detecting each type of object from a plurality of objects included in an image;
    an evaluation value calculation device for calculating evaluation values of the objects detected by the object detection device, using predetermined evaluation criteria corresponding to the types of objects; and
    an image display control device to
        determine, for each type of object, whether there is an object of which the evaluation value calculated by the evaluation value calculation device is equal to or greater than a threshold value, which either is set in advance for each type of object or is a threshold value of each type of object determined by a user, and
        display the image so as to highlight the object in a case when there is an object having a respective evaluation value that is equal to or greater than the threshold value, wherein
    the types of objects include a person and a non-person object, and
    the evaluation value calculation device calculates the evaluation values of the objects detected by the object detection device, using different evaluation criteria for the person between the object and the non-person object.

2. The image display control system according to claim 1, wherein,
    in a case in which there is an object of which the evaluation value calculated by the evaluation value calculation device is equal to or greater than the threshold value, the image display control device displays the image such that the types of objects are displayed in different modes.

3. The image display control system according to claim 1, further comprising:
    a theme determination device for determining a theme of a plurality of images including the image, wherein
    the evaluation value calculation device calculates the evaluation values of the objects detected by the object detection device, using evaluation criteria in which an object of a type associated with the theme determined by the theme determination device has a higher evaluation value than an object of a type other than the type associated with the theme determined by the theme determination device.

4. The image display control system according to claim 3, wherein
    the theme determination device determines the theme of an album to be generated, on the basis of the plurality of images.

5. The image display control system according to claim 1, wherein,
    in a case in which the image includes a person as the object, the evaluation value calculation device calculates the evaluation value of the person as the object, using the evaluation criteria for the person as the object, and
    in a case in which the image does not include a person as the object, the evaluation value calculation device calculates the evaluation value of the non-person object, using the evaluation criteria for the non-person object.

6. The image display control system according to claim 1, wherein
    the image display control device displays the image such that the person between the object of which the evaluation value calculated by the evaluation value calculation device is equal to or greater than the threshold value and the non-person object of which the evaluation value calculated by the evaluation value calculation device is equal to or greater than the threshold value are displayed in different modes.

7. The image display control system according to claim 1, wherein,
in a case in which the non-person objects are classified according to the type of object, the evaluation value calculation device calculates the evaluation values of the objects detected by the object detection device, using different evaluation criteria for the classified objects.

8. The image display control system according to claim 7, further comprising:
a classification method setting device for setting an object classification method in a case in which the non-person objects are classified according to the type of object.

9. The image display control system according to claim 7, wherein
the image display control device displays the image such that the classified types of non-person objects are displayed in different modes.

10. The image display control system according to claim 1, further comprising:
an evaluation criterion change device for changing the evaluation criteria.

11. The image display control system according to claim 1, further comprising:
a type designation device for designating the type of object, wherein
the image display control device displays an image including the type of object designated by the type designation device so as not to be highlighted.

12. The image display control system according to claim 1, further comprising:
an appearance frequency calculation device, wherein
the image is included in a plurality of images,
the object detection device detects each type of object in the image included in the plurality of images,
the appearance frequency calculation device calculates an appearance frequency of each type of object detected by the object detection device, and
the evaluation value calculation device calculates the evaluation values of the objects such that an evaluation value in a case in which the appearance frequency calculated by the appearance frequency calculation device is greater than a threshold value is greater than an evaluation value in a case in which the appearance frequency is less than the threshold value.

13. The image display control system according to claim 1, further comprising:
a designation device for designating an image including a person as the object from a plurality of images; and
an extraction device for extracting an image that includes a non-person object related to the person in the image designated by the designation device from the plurality of images, wherein
the evaluation value calculation device calculates the evaluation value of the non-person object included in the image extracted by the extraction device, using different evaluation criteria for the types of objects.

14. The image display control system according to claim 13, further comprising:
a selection device for selecting an image from the images extracted by the extraction device, wherein
the image display control device displays the image designated by the designation device and the image selected by the selection device in the same region.

15. An image display control method comprising:
allowing an object detection device to detect each type of object from a plurality of objects included in an image;
allowing an evaluation value calculation device to calculate evaluation values of the objects detected by the object detection device, using predetermined evaluation criteria corresponding to the types of objects, wherein the types of objects include a person and a non-person object;
allowing an image display control device to
determine, for each type of object, whether there is an object of which the evaluation value calculated by the evaluation value calculation device is equal to or greater than a threshold value, which either is set in advance for each type of object or is a threshold value of each type of object determined by a user, and
display the image so as to highlight the object in a case when there is an object having a respective evaluation value that is equal to or greater than the threshold value; and
allowing the evaluation value calculation device to calculate the evaluation values of the objects detected by the object detection device, using different evaluation criteria for the person between the object and the non-person object.

16. Non-transitory computer readable medium storing a computer readable program that controls a computer of an image display control system such that the computer performs:
detecting each type of object from a plurality of objects included in an image;
calculating evaluation values of the detected objects, using predetermined evaluation criteria corresponding to the types of objects, wherein the types of objects include a person and a non-person object;
determining, for each type of object, whether there is an object of which the calculated evaluation value is equal to or greater than a threshold value, which either is set in advance for each type of object or is a threshold value of each type of object determined by a user;
displaying the image so as to highlight the object in a case when there is an object having a respective evaluation value that is equal to or greater than the threshold value; and
calculating the evaluation values of the detected objects, using different evaluation criteria for the person between the object and the non-person object.

17. An image display control system comprising:
an object detection device for detecting each type of object from a plurality of objects included in an image; and
a processor circuitry configured to
calculate evaluation values of the objects detected by the object detection device, using predetermined evaluation criteria corresponding to the types of objects, wherein the types of objects include a person and a non-person object,
determine, for each type of object, whether there is an object of which the evaluation value calculated by the evaluation value calculation device is equal to or greater than a threshold value, which either is set in advance for each type of object or is a threshold value of each type of object determined by a user,
display the image so as to highlight the object in a case when there is an object having a respective evaluation value that is equal to or greater than the threshold value, and calculate the evaluation values of the detected objects, using different evaluation criteria for the person between the object and the non-person object.

18. An image display control system comprising:
an object detection device for detecting each type of object from a plurality of objects included in an image;
an evaluation value calculation device for calculating evaluation values of the objects detected by the object detection device, using predetermined evaluation criteria corresponding to the types of objects;
an image display control device to determine, for each type of object, whether there is an object of which the evaluation value calculated by the evaluation value calculation device is equal to or greater than a threshold value, which either is set in advance for each type of object or is a threshold value of each type of object determined by a user, and display the image so as to highlight the object in a case when there is an object having a respective evaluation value that is equal to or greater than the threshold value; and
a theme determination device for determining a theme of a plurality of images including the image, wherein
the evaluation value calculation device calculates the evaluation values of the objects detected by the object detection device, using evaluation criteria in which an object of a type associated with the theme determined by the theme determination device has a higher evaluation value than an object of a type other than the type associated with the theme determined by the theme determination device.

19. An image display control system comprising:
an object detection device for detecting each type of object from a plurality of objects included in an image;
an evaluation value calculation device for calculating evaluation values of the objects detected by the object detection device, using predetermined evaluation criteria corresponding to the types of objects;
an image display control device to determine, for each type of object, whether there is an object of which the evaluation value calculated by the evaluation value calculation device is equal to or greater than a threshold value, which either is set in advance for each type of object or is a threshold value of each type of object determined by a user, and display the image so as to highlight the object in a case when there is an object having a respective evaluation value that is equal to or greater than the threshold value;
a designation device for designating an image including a person as the object from a plurality of images; and
an extraction device for extracting an image that includes a non-person object related to the person in the image designated by the designation device from the plurality of images, wherein
the evaluation value calculation device calculates the evaluation value of the non-person object included in the image extracted by the extraction device, using different evaluation criteria for the types of objects.

* * * * *